Jan. 20, 1942.  H. LYON  2,270,456
PINKING MACHINE
Filed Feb. 13, 1941  2 Sheets-Sheet 2
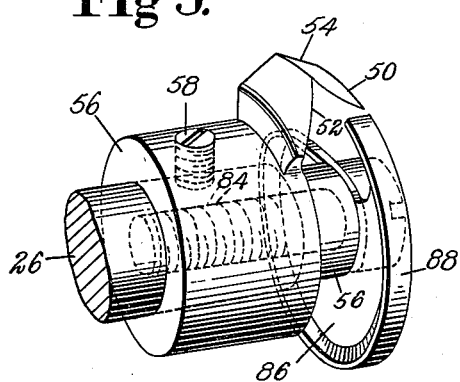
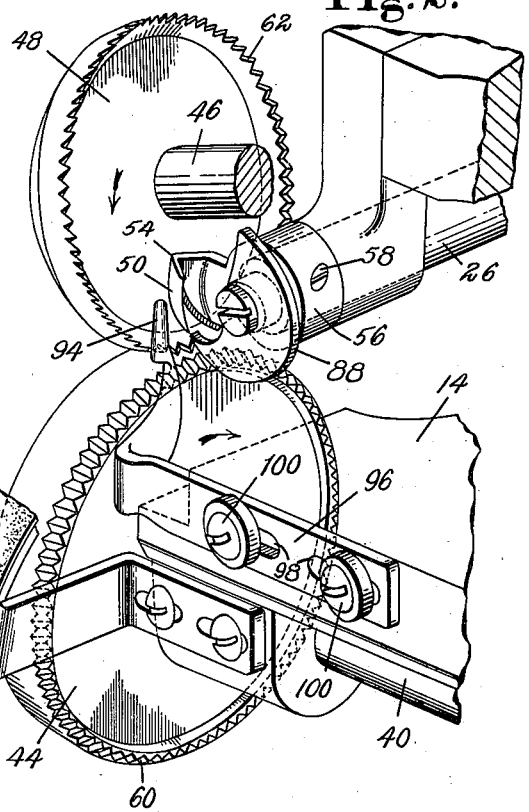
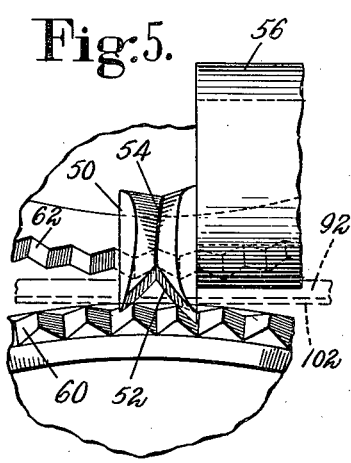
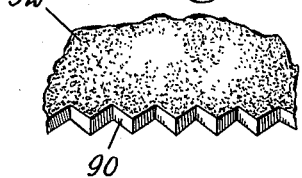
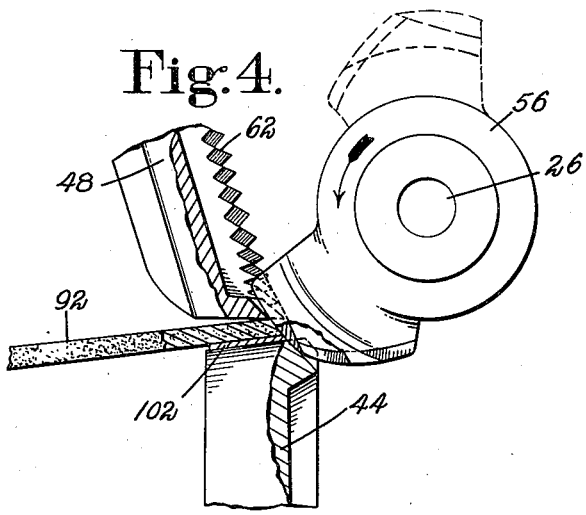

Patented Jan. 20, 1942

2,270,456

UNITED STATES PATENT OFFICE 2,270,456

PINKING MACHINE

Harry Lyon, Haverhill, Mass., assignor to United Shoe Machinery Corporation, Flemington, N. J., a corporation of New Jersey Application February 13, 1941, Serial No. 378,759

7 Claims. (Cl. 164—64)

This invention relates to a machine for forming a serrated edge upon a work piece by cutting therein a continuous series of notches, an operation commonly referred to as pinking.

It is an object of the invention to provide a pinking machine which will operate rapidly, cleanly, and uniformly, upon work pieces of all sizes and shapes without the necessity for making any changes or adjustments of dies or cutting tools.

With this object in view, a feature of the invention resides in the combination with means for feeding a work piece of a helical, rotary cutter for notching its edge and a support for sustaining the edge portion of the work piece while it is being notched. By employing a rotary cutter of helical form it becomes possible to feed the work continuously while the pinking notches are being cut successively in the edge of the work piece. The pinking operation thus proceeds progressively and rapidly along the edge of the work piece, regardless of the shape or size thereof.

Another feature of the invention consists in an organization of work feeding mechanism and a rotary pinking cutter adapted to produce beveled pinking in which the cuts are not made vertically through the material but the cut surfaces are so inclined relatively to the surface of the work piece that the sides of the notches formed in the edge of the material are beveled. This beveled effect is much desired in many articles, examples of which are vamps, quarters and toe tip blanks for shoe uppers.

In the illustrated machine the beveled result is produced by positioning the axis of rotation of the cutter at one side of, above, and parallel to the path of movement of the edge of the work piece as the latter is fed past the cutter.

A further feature of the invention consists in the provision of a rotating work edge engaging member cooperating with the cutter to control the depth of the notches made thereby and insure that they shall all be of the same depth. In the illustrated machine this member is arranged on the cutter shaft in line with a portion of the cutter and in advance of the cutting edge thereof.

These and other features of the invention and advantages resulting from the use thereof will be better understood and appreciated from the following detailed description of one practical embodiment thereof, to be read in connection with the accompanying drawings, in which—

Fig. 2 is an angular view, on an enlarged scale, showing the relation between the rotary cutter and the work supporting and feeding mechanism;

Fig. 3 is an angular view, on a still larger scale, of the rotary cutter;

Fig. 4 is a fragmentary view, partly in section, illustrating the relation between the cutter, the work supporting and feeding wheels, and the work;

Fig. 5 is a fragmentary view in elevation as seen from the right hand side of Fig. 4; and Fig. 6 is an angular view of a fragment of a work piece, the edge of which has been pinked by the machine.

Figure 1:
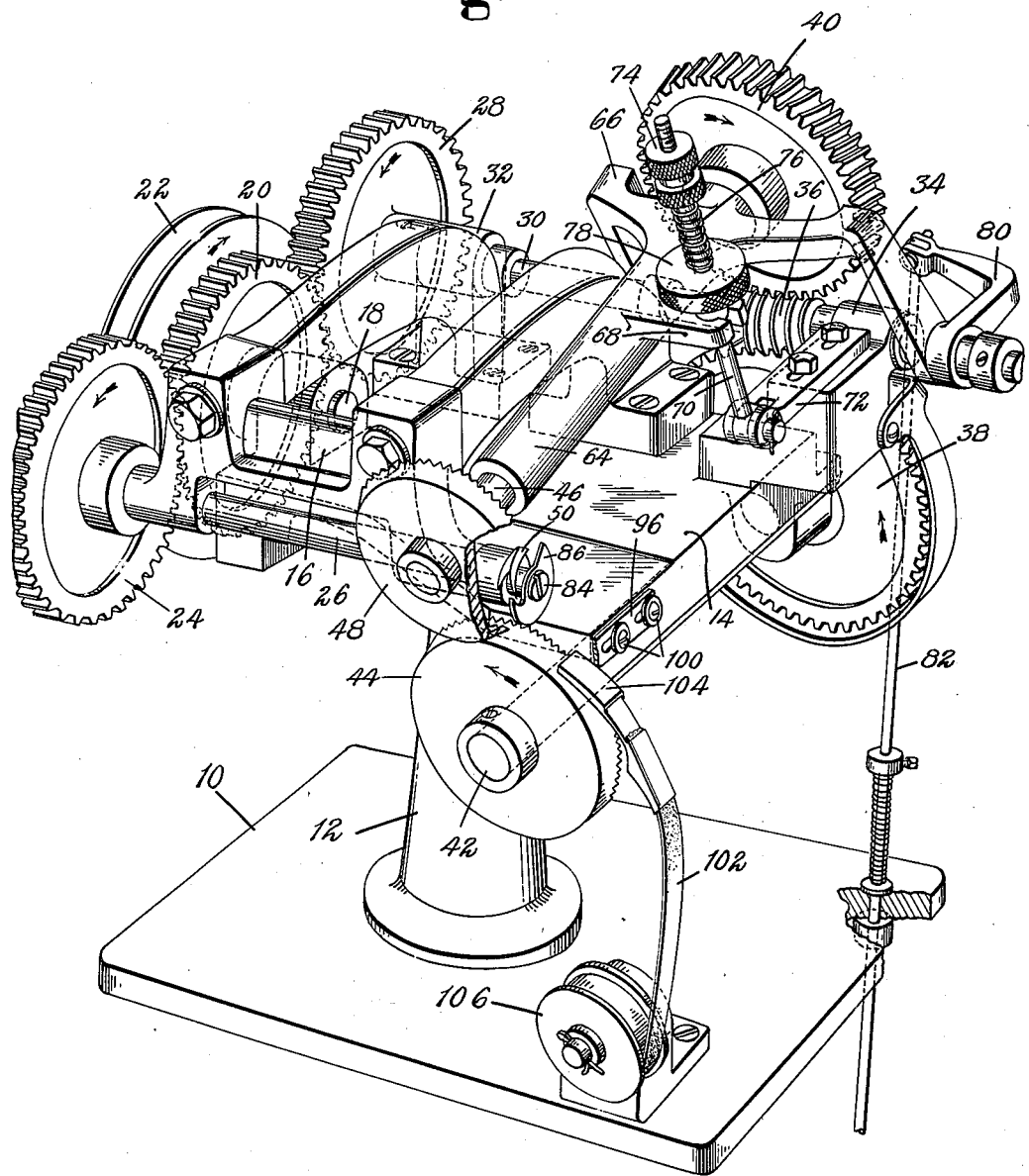
Fig. 1 is an angular view of the entire machine.

Referring now to the drawings, 10 indicates a base plate from which arises a column 12 carrying a table 14 upon which the mechanism of the machine is mounted.

Secured in a pillow block 16 upon the table 14 is a stud 18 upon which is journaled a gear 20 having secured thereto a pulley 22 which may be belt driven from any suitable source of power. Meshing with the gear 20 is a gear 24 affixed to a rotary cutter shaft 26 arranged at the front of the machine and having its axis of rotation at one side of, above, and parallel to the path of feeding movement of the work. Also meshing with the gear 20 is a gear 28 which is affixed to a worm shaft 30 running in bearings 32 and 34 secured upon the table 14. This worm shaft carries a worm 36 which is constantly in mesh with two worm gears 38, 40.

The worm gear 38 is secured to the rear end of a shaft 42 which has affixed to its front end a work supporting wheel 44, and the worm gear 40 is secured to the rear end of a shaft 46, to the front end of which is affixed a feed wheel 48.

From the foregoing it will be apparent that the work supporting wheel 44 and the feed wheel 48 are positively geared to each other and to the cutter shaft 26. The gearing between the work supporting wheel and the feed wheel is so proportioned that the peripheral speed of the two wheels is the same and, consequently, they can operate to feed a work piece introduced between them without any relative slippage.

On the end of the cutter shaft 26 is secured a segmental helical cutter 50 which is V-shaped in cross section as best seen in Figs. 2 and 3 and has a sharpened V-shaped cutting edge 52. The apex, or backbone, 54 of the cutter is in the form of a portion of a helix the axis of which coincides with the axis of the cutter shaft 26 and the cutter has an integral hub 56 which is securely fastened to the shaft by a set screw 58.

The work supporting wheel 44 is notched around its peripheral edge, as illustrated at 60, and the feed wheel 48 is correspondingly notched, as shown at 62. The two wheels are so disposed that a notch in one aligns exactly with a notch in the other at the work feeding point and this relation is maintained by the gearing as the wheels rotate. The position of the cutter 50 on its shaft is such that the backbone 54 of the cutter registers with successive notches in the wheels 44 and 48 as the cutter and the wheels rotate, since the pitch of the helix of the cutter is equal to the distance between adjacent notches in either of the wheels and, consequently, both the work supporting and feed wheels and the cutter can rotate continuously without any mechanical interference, the time relation between the three cooperating rotating elements being permanently preserved by the gearing which connects them positively to each other.

In order to permit the feed wheel 48 to yield upward to accommodate itself to work of different thicknesses, the shaft 46 runs in a long bearing member 64 which is integral with a yoke 66 supported for pivotal movement around the worm shaft 30 so that the worm gears 40 will remain constantly in mesh with the worm 36. Projecting laterally from the bearing member 64 is a forked lug 68 through which passes an upright rod 70 pivoted at its lower end to a stationary bracket 72. The upper end of the rod 70 is threaded and screwed upon it is a nut 74 below which is a compressed spring 76 bearing upon a collar 78 which is free to slide up and down the rod. The lower end of this collar bears on the top of the lug 68; the feed wheel 48 is therefore pressed down upon the work by the spring 76 with an amount of pressure determined by the adjustment of the nut 74.

A rearwardly extending arm 80, rigid with the yoke 66, is actuated by a treadle rod 82 so that when the treadle rod is lowered the feed wheel 48 will be raised to permit the work to be introduced or adjusted between the work supporting and feed wheels 44, 48. By swinging the rod 70 outwardly about its pivot, the collar 78 may be disengaged from the lug 68 in order to permit the feed wheel to be swung up out of the way to afford easy access to the cutter.

Secured to the end of the cutter shaft 26 by a screw 84 is a work edge engaging member 86 having a smooth periphery 88. The radius of this member is less than the radius of the backbone 54 of the segmental cutter by an amount substantially equal to the depth of the notch 90 to be formed in the edge of the work piece 92 (Fig. 6) and the peripheral portion 88 of the member 86 is in line with a portion of the cutter and is set angularly just ahead of the cutting edge 52 thereof, so as to aid in positioning the edge of the work piece just before a cut is started. Thus the depth of each notch 90 is accurately controlled and all notches will be of the same depth.

Proper presentation of the work piece to the feed mechanism and the cutter is facilitated by an edge gage 94, the shank portion 96 of which is provided with slots 98 through which pass screws 100 threaded into the stationary table 14. By loosening the screws the gage may be adjusted transversely of the feed mechanism to the proper position to guide the edge of the work piece accurately thereto.

In order to produce clean cutting of some materials it is desirable to cut upon a paper tape and such a tape is shown at 102, an adjustable guide 104 being provided to position the tape correctly for the cutting operation. A roll of tape may be kept on a reel beneath the bench on which the pinking machine is installed and the tape may be guided on its way to the guide 104 by a roller 106 mounted upon the base 10.

If the path in which the work piece 92 is fed between the wheels 44 and 48 is at the same level as the axis of the cutter shaft 26 the notches in the edge of the work piece will be cut through vertically, substantially at right angles to the surface of the work, but the machine is illustrated herein as arranged to produce a beveled cut and this is accomplished by arranging the axis of the cutter shaft 26 at one side of and somewhat above the level of the work at the cutting position. The relation between the parts is best shown in Fig. 4 wherein it can be seen how the described arrangement produces a bevel cut. The angle of bevel will obviously be determined by the height of the axis of the cutter shaft above the work and its lateral displacement from the edge of the work piece.

Having described the invention, what is claimed as new and desired to be secured by Letters Patent is:

1. In a machine for pinking the edge of a work piece, the combination of a work feeding wheel, means for continuously and positively rotating the same, a cooperating work supporting wheel, and a continuously and positively rotated work edge notching cutter positioned adjacent to the feeding point between said wheels and having its axis of rotation parallel to the path of movement of the work between said wheels.

2. In a machine for pinking the edge of a work piece, the combination of cooperating work feeding and supporting wheels having notched edges, means for continuously and positively rotating the same, and a continuously rotated work edge notching cutter positively geared to said wheels and having its axis of rotation parallel to the path of movement of the work between said wheels, said cutter being so timed relatively to the wheels that the cutter passes successively through the notches in the edges of the wheels.

3. In a machine for producing beveled pinking of the edge of a work piece, the combination of means for supporting and feeding the work piece at a predetermined level, and a rotary cutter for notching its edge, said cutter being positioned adjacent to the feeding point and having its axis of rotation above the level of the work being fed.

4. In a machine for progressively producing beveled pinking of the edge of a work piece, the combination of means for supporting and continuously feeding the work piece at a predetermined level, and a helical, rotary edge notching cutter synchronized with the work feeding means and having its axis of rotation at one side of, above, and parallel to the path of movement of the edge of the work piece.

5. In a machine for pinking the edge of a work piece, the combination of means for feeding said edge past an operating point, a rotating cutter arranged to cut notches in said edge at the operating point, and a rotating work edge engaging member cooperating with the cutter to control the depth of said notches.

6. In a machine for pinking the edge of a work piece, the combination of means for feeding said edge past an operating point, a rotating cutter shaft, a cutter on the shaft arranged to cut notches in said edge at the operating point, and a rotating work edge engaging member on said shaft in cooperative relation with the cutter to control the depth of the notches made by the cutter.

7. In a machine for pinking the edge of a work piece, the combination of means for feeding said edge past an operating point, a rotating cutter shaft, a segmental cutter on the shaft arranged to cut notches in said edge at the operating point, and a work edge engaging member of less radius than the cutter arranged on the shaft in line with a portion of the cutter and in advance of the cutting edge thereof to control the depth of the notches made by the cutter.

HARRY LYON.